(No Model.) 2 Sheets—Sheet 1.
K. H. NICHOLS.
TREE BOX.
No. 325,184. Patented Aug. 25, 1885.
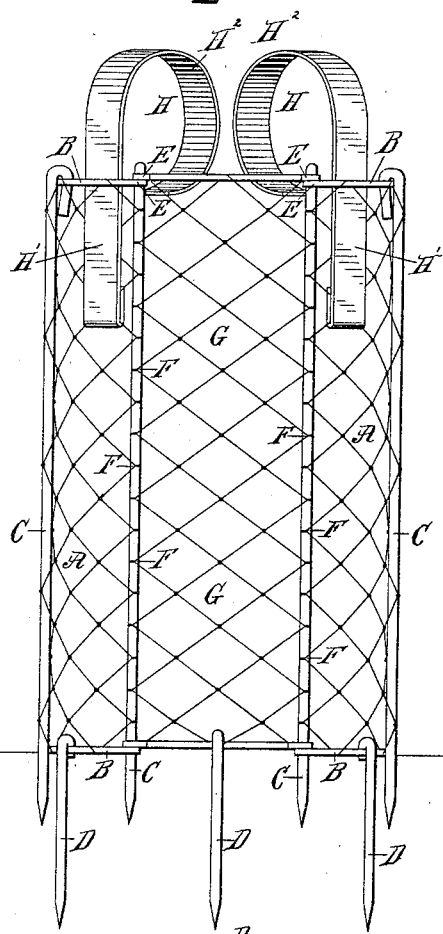
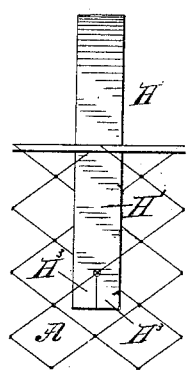
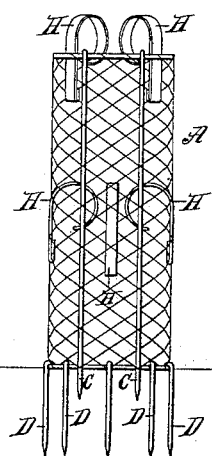
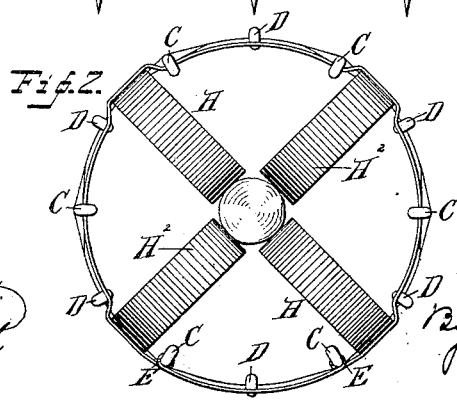
Witnesses,
E. C. Perkins
A. B. Fairchild
Inventor,
Kepler H. Nichols
by J. H. Wooster
atty.

(No Model.) 2 Sheets—Sheet 2.

K. H. NICHOLS.
TREE BOX.

No. 325,184. Patented Aug. 25, 1885.

Witnesses,
C. C. Perkins.
C. E. Ruggles.

Inventor,
Kepler H. Nichols
By A. M. Wooster
Atty.

UNITED STATES PATENT OFFICE.

KEPLER H. NICHOLS, OF FAIRFIELD, CONNECTICUT.

TREE-BOX.

SPECIFICATION forming part of Letters Patent No. 325,184, dated August 25, 1885.

Application filed May 26, 1885. (No model.)

*To all whom it may concern:*

Be it known that I, KEPLER H. NICHOLS, a citizen of the United States, residing at Fairfield, in the county of Fairfield and State of Connecticut, have invented certain new and useful Improvements in Tree-Boxes; and I do hereby declare the following to be a full, clear, and exact description of the invention, such as will enable others skilled in the art to which it appertains to make and use the same.

My invention has for its object to produce an adjustable tree-box which shall be simple and durable in construction and economical in cost, and which, while partially sustained by the tree, shall itself aid in sustaining young trees.

With these ends in view I have devised the novel construction which I will now describe, referring by letters to the accompanying drawings, forming a part of this specification, in which—

Figure 6:
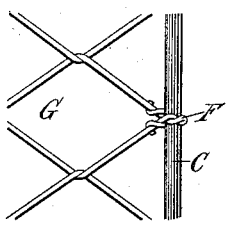
Figure 5:
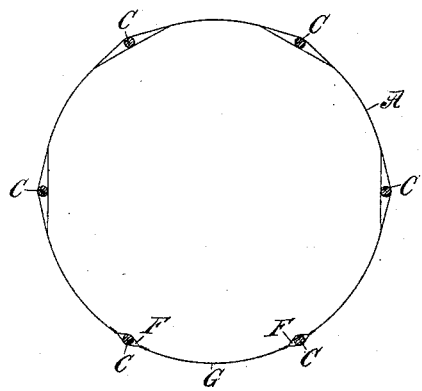

Figure 1 is an elevation of a tree-box complete, showing the box enlarged by the insertion of a supplemental piece, two springs only being shown for the sake of clearness. Fig. 2 is a plan view corresponding with Fig. 1, four springs being shown, and also a section of a tree to illustrate the action of the springs. Fig. 3 is an elevation of a tree-box on a smaller scale, two sets of springs being shown. Fig. 4 is a detached view illustrating a modified form of the detachable springs. Fig. 5 is a horizontal section of the box, and Fig. 6 is an enlarged detail view of one of the eyes at the edges of the box.

A is the box, which may be made of any suitable material. I preferably, however, use galvanized wire-netting of any desired style.

B B are strips or bands at the top and bottom of the box, usually made of heavy wire, which serve to hold it in proper shape. I have shown the box made round. It may, however, be made polygonal in form, if preferred.

C represents a series of rods, which are clasped over the band at the top and extend down alternately over and under the meshes of the netting, as shown in Fig. 1, and are driven into the ground when the box is set in place. Between rods C is a series of shorter rods, D, which are clasped over the bands at the bottom, and are driven into the ground to give additional stability to the box.

E represents eyes at the ends of the bands, and F similar eyes formed of the wires of the netting at the outer edges of the piece forming the box.

In setting the box, it is placed around the tree. The eyes at the opposite ends of the piece forming the box are brought together, and the two ends are firmly joined by forcing one of the rods C down through all the eyes.

In Fig. 1 I have illustrated a box made larger by the insertion of a supplemental piece, G, having strips B at top and bottom, and eyes E and F at both edges, so that when a rod, C, is driven down at each edge engaging all of the eyes, the supplemental piece becomes part of the box as much as the original piece. This, of course, only has to be done when the tree gets quite large.

H represents detachable springs, each of which has a straight portion, H', and a curved portion, H², which bears against the body of the tree. These springs may be made of wire or of sheet metal, preferably the latter, and I ordinarily attach them in place by running the straight portion over and under alternate meshes of the netting, curving the end upward, and pressing it firmly down upon the netting, one or two crossings of the wire being caught between the straight portion and the turned-over portion of the spring, thus holding it firmly in place. Any number of sets of these springs may be used. Ordinarily two will be quite sufficient, and any number of springs may be used in a set, four being the number that I ordinarily use. It will be seen that by the use of these springs I accomplish very valuable results in that I make the box hold the tree and the tree assist in holding the box. The pressure of the springs against the tree is of such a nature that while both tree and box are held firmly in position not the slightest injury can be done to the tree, as the springs yield to the expansion of the tree in growing.

By making the springs detachable I overcome the serious objections to all tree-boxes of this class heretofore devised.

With my improved construction the position of the springs can be changed at any time. New ones may be inserted, or they may be wholly removed and new ones put in their place. The springs, in short, can be put just where they are wanted in old or new boxes without disturbing the box in the slightest. The expense of manufacture is greatly reduced, and the appearance of the box greatly improved, in that all bands, except the ones at top and bottom, are dispensed with, and there is not a single rivet in the entire box.

In the modified form of spring, illustrated in Fig. 4, I do not bend the end of the spring upward and press it against the netting upon the inside of the box, but instead I punch a hole through the spring near the bottom and slit the spring from the bottom up to the hole, so that the lower end of the spring consists of two tongues, H³.

In applying the spring one tongue is run inside of the netting, the other outside thereof, as shown, one of the crossings of the wire resting in the hole. The two tongues are then bent parallel, which holds the spring securely in place.

I do not, of course, limit myself to the exact construction shown, as it is obvious that the details may be varied within reasonable limits without departing from the spirit of my invention.

I claim—

1. A tree-box consisting of a strip of netting having eyes at both edges, a band at the top passing through the meshes of the netting, and having eyes at its ends and rods clasped over said band, which extend down through the meshes of the netting and into the ground, one of said rods being passed through the eyes at the edges of the netting and the ends of the bands.

2. In a tree-box, a strip of netting having eyes at both edges and bands at top and bottom passing through the meshes of the netting, and having eyes at both ends, in combination with rods clasped over the top band and extending down through the meshes of the netting and into the ground, one of said rods passing through said eyes, and other rods adapted to be clasped over the bottom band and driven into the ground.

3. In a tree-box, the combination, with a strip of netting and rods for securing the edges together and for securing the box to the ground, of detachable springs which bear against the tree and are bent at their lower ends to clamp the wires of the netting.

In testimony whereof I affix my signature in presence of two witnesses.

KEPLER H. NICHOLS.

Witnesses:
A. M. WOOSTER,
A. B. FAIRCHILD.